(12) United States Patent
Johansson et al.

(10) Patent No.: US 10,554,346 B2
(45) Date of Patent: Feb. 4, 2020

(54) ALLOCATING SPACE FOR A PLURALITY OF CONTROL SETS FOR HARQ

(71) Applicant: Telefonaktiebolaget LM Ericsson (publ), Stockholm (SE)

(72) Inventors: Anders Johansson, Hässelby (SE); Karl Mann, Ottawa (CA); Christian Skärby, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/763,085

(22) PCT Filed: Sep. 25, 2015

(86) PCT No.: PCT/SE2015/051005
§ 371 (c)(1),
(2) Date: Mar. 23, 2018

(87) PCT Pub. No.: WO2017/052434
PCT Pub. Date: Mar. 30, 2017

(65) Prior Publication Data
US 2018/0219650 A1    Aug. 2, 2018

(51) Int. Cl.
*H04L 1/18*    (2006.01)
*H04L 1/16*    (2006.01)
*H04L 5/00*    (2006.01)

(52) U.S. Cl.
CPC .......... *H04L 1/1861* (2013.01); *H04L 1/1607* (2013.01); *H04L 1/1812* (2013.01); *H04L 5/0055* (2013.01)

(58) Field of Classification Search
CPC ... H04L 1/1861; H04L 1/1607; H04L 1/1864; H04L 1/1896; H04L 1/1671; H04L 1/1812; H04L 47/12; H04L 5/0035; H04J 3/1694
(Continued)

(56) References Cited

U.S. PATENT DOCUMENTS

2013/0022011 A1*  1/2013  Enomoto ............... H04L 1/0026
                                                370/329
2015/0016311 A1*  1/2015  Han ...................... H04W 24/10
                                                370/280
(Continued)

OTHER PUBLICATIONS

International Search Report and Written Opinion for International Application No. PCT/SE2015/051005, dated Jul. 8, 2016, 9 pages.
(Continued)

*Primary Examiner* — Jeffrey M Rutowski
*Assistant Examiner* — Sudesh M Patidar
(74) *Attorney, Agent, or Firm* — NDWE LLP

(57) ABSTRACT

A method for allocating space for a plurality of control sets for Hybrid Automatic Repeat Request (HARQ), wherein each control set comprising elements for carrying HARQ indicators. The method is performed in a network node and comprises determining a largest set size, in number of resources, of any one of the plurality of control sets; determining a target size, in number of resources, to be allocated for HARQ; allocating a HARQ space, wherein the HARQ space having a size, in number of resources, being a maximum of the largest set size and the target size; and spreading the plurality of control sets within the HARQ space. The HARQ space can be used in the uplink, for providing HARQ feedback on downlink information.

16 Claims, 3 Drawing Sheets

(58) Field of Classification Search
USPC .................................................. 370/329, 429
See application file for complete search history.

(56) References Cited

U.S. PATENT DOCUMENTS

| 2015/0215081 A1* | 7/2015 | Chae .................... H04L 5/0055 370/329 |
| 2015/0296497 A1* | 10/2015 | Nguyen ............ H04W 72/0446 370/329 |
| 2016/0248553 A1* | 8/2016 | Shimezawa ............... H04L 5/14 |

OTHER PUBLICATIONS

"HARQ-ACK feedback for TDD inter-band CA," May 21-25, 2012, 2 pages, 3GPP TSG RAN WG1 Meeting #69, R1-122031, Prague, Czech Republic.
3GPP TS 36.211, "3rd Generation Partnership Project; Technical Specification Group Radio Access Network; Evolved Universal Terrestrial Radio Access (E-UTRA); Physical channels and modulation (Release 11)," Sep. 2014, 120 pages, V11.6.0, 3GPP Organizational Partners.
3GPP TS 36.213, "3rd Generation Partnership Project; Technical Specification Group Radio Access Network; Evolved Universal Terrestrial Radio Access (E-UTRA); Physical layer procedures (Release 11)," Mar. 2015, 182 pages, V11.10.0, 3GPP Organizational Partners.
Office Action from foreign counterpart European Patent Application No. 15779038.7 dated Jan. 22, 2019, 4 pages.
International Preliminary Report on Patentability for Application No. PCT/SE2015/051005 dated Mar. 27, 2018, 8 pages.

* cited by examiner

ALLOCATING SPACE FOR A PLURALITY OF CONTROL SETS FOR HARQ

CROSS-REFERENCE TO RELATED APPLICATIONS

This application is a National stage of International Application No. PCT/SE2015/051005, filed Sep. 25, 2015, which is hereby incorporated by reference.

TECHNICAL FIELD

The invention relates to a method, network node, computer program and computer program product for allocating space for a plurality of control sets for HARQ.

BACKGROUND

Cellular communication networks evolve towards higher data rates, together with improved capacity and coverage. In the 3rd Generation Partnership Project (3GPP) standardization body, several technologies have been and are also currently being developed.

LTE (Long Term Evolution) is a recently standardised technology. It uses an access technology based on OFDM (Orthogonal Frequency Division Multiplexing) for the downlink (DL) and Single Carrier FDMA (SC-FDMA) for the uplink (UL). The resource allocation to wireless devices on both DL and UL is performed adaptively using the concept of fast scheduling, taking into account the instantaneous traffic pattern and radio propagation characteristics of each wireless device. Assigning resources in both DL and UL is performed in the scheduler situated in a network node such as the radio base station.

For handling retransmissions of failed Media Access Control (MAC) packets, Hybrid Automatic Repeat Request (HARQ) is used. The HARQ procedure involves providing quick feedback in the form of acknowledgements (ACK) or negative acknowledgements (NACK) to the transmitter for each transport block, depending on the result of the decoding applied at the receiver. HARQ is applied both for downlink transmissions and uplink transmissions.

However, the need for HARQ feedback is increasing, e.g. due to introduction of downlink control transmissions using Enhanced Physical Downlink Control Channel (EPDCCH). Determining the appropriate amount of resources to allocate for HARQ feedback is very difficult. On the one hand, more resources are beneficial to ensure the HARQ feedback is fed back correctly. On the other hand, less resources for HARQ feedback is beneficial to provide more resources for user data.

SUMMARY

One object is to balance how much space is allocated for HARQ feedback in the uplink.

According to a first aspect, it is presented a method for allocating space for a plurality of control sets for HARQ, Hybrid Automatic Repeat Request, each control set comprising elements for carrying HARQ indicators. The method is performed in a network node and comprises the steps of: determining the largest set size, in number of resources, of any one of the plurality of control sets; determining a target size, in number of resources, to be allocated for HARQ; allocating a HARQ space, the HARQ space having a size, in number of resources, being the maximum of the largest set size and the target size; and spreading the plurality of control sets within the HARQ space. The HARQ space can be used in the uplink, for providing HARQ feedback on downlink information.

The step of determining the target size may comprise considering a first parameter indicating a maximum number of HARQ indicators per cell and subframe.

The step of determining the target size may comprise considering a second parameter indicating a target number of HARQ indicators per resource.

The step of determining the target size may comprise calculating the target size using a quote of the first parameter divided by the second parameter. In other words, the quote is calculated as the first parameter divided by the second parameter.

Each resource may be defined by a pair of physical resource blocks, PRB, and a spreading code. In this way, several resources can be code multiplexed on a pair of PRBs using the spreading code.

The step of spreading may comprise spreading mid points of the plurality of control sets and shifting any control set having any elements outside the HARQ space.

The plurality of control sets for HARQ may both comprise control sets for Physical Downlink Control Channel, PDCCH, and Enhanced Physical Downlink Control Channel, EPDCCH. The control sets are transmitted in the uplink.

The step of spreading may comprise spreading any control set for PDCCH before spreading the control sets for EPDCCH.

According to a second aspect, it is presented a network node for allocating space for a plurality of control sets for HARQ, Hybrid Automatic Repeat Request, each control set comprising elements for carrying HARQ indicators. The network node comprises: a processor; and a memory storing instructions that, when executed by the processor, cause the network node to: determine the largest set size, in number of resources, of any one of the plurality of control sets; determine a target size, in number of resources, to be allocated for HARQ; allocate a HARQ space, the HARQ space having a size, in number of resources, being the maximum of the largest set size and the target size; and spread the plurality of control sets within the HARQ space.

The instructions to determine the target size may comprise instructions that, when executed by the processor, cause the network node to consider a first parameter indicating a maximum number of HARQ indicators per cell and subframe.

The instructions to determine the target size may comprise instructions that, when executed by the processor, cause the network node to consider a second parameter indicating a target number of HARQ indicators per resource.

The instructions to determine the target size may comprise instructions that, when executed by the processor, cause the network node to calculate the target size using a quote of the first parameter divided by the second parameter.

Each resource may be defined by a pair of physical resource blocks, PRB, and a spreading code.

The instructions to spread may comprise instructions that, when executed by the processor, cause the network node to spread mid points of the plurality of control sets and shifting any control set having any element outside the HARQ space.

The plurality of control sets for HARQ may both comprise control sets for Physical Downlink Control Channel, PDCCH, and Enhanced Physical Downlink Control Channel, EPDCCH.

The instructions to spread may comprise instructions that, when executed by the processor, cause the network node to spread the control sets for PDCCH before spreading the control sets for EPDCCH.

According to a third aspect, it is presented a network node comprising: means for determining the largest set size, in number of resources, of any one of a plurality of control sets for HARQ, Hybrid Automatic Repeat Request, each control set comprising elements for carrying HARQ indicators; means for determining a target size, in number of resources, to be allocated for HARQ; means for allocating a HARQ space, the HARQ space having a size, in number of resources, being the maximum of the largest set size and the target size; and means for spreading the plurality of control sets within the HARQ space.

According to a fourth aspect, it is presented a computer program for allocating space for a plurality of control sets for HARQ, Hybrid Automatic Repeat Request, each control set comprising elements for carrying HARQ indicators. The computer program comprises computer program code which, when run on a network node causes the network node to: determine the largest set size, in number of resources, of any one of the plurality of control sets; determine a target size, in number of resources, to be allocated for HARQ; allocate a HARQ space, the HARQ space having a size, in number of resources, being the maximum of the largest set size and the target size; and spread the plurality of control sets within the HARQ space.

According to a fifth aspect, it is presented a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
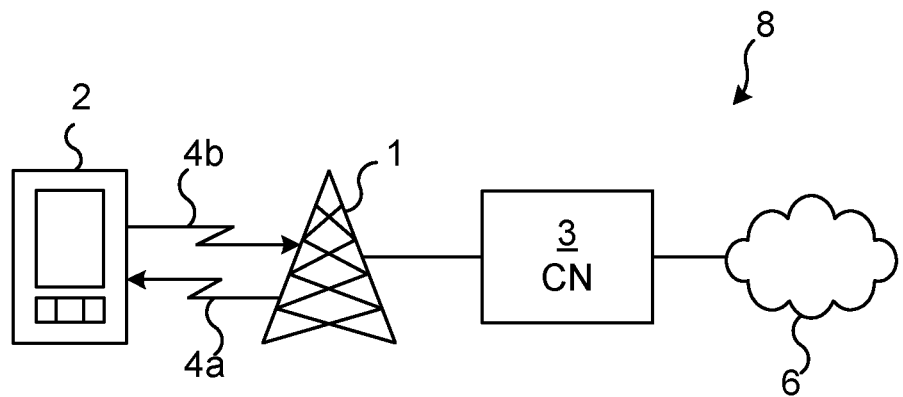
FIG. 1 is a schematic diagram illustrating an environment in which embodiments presented herein can be applied.

FIG. 1 is a schematic diagram illustrating a cellular network 8 where embodiments presented herein may be applied. The cellular network 8 comprises a core network 3 and one or more network nodes 1, here in the form of radio base stations being evolved Node Bs, also known as eNode Bs or eNBs. The network node 1 could also be in the form of Node Bs, BTSs (Base Transceiver Stations) and/or BSSs (Base Station Subsystems), etc. The network node 1 provides radio connectivity to a plurality of wireless devices 2. The term wireless device is also known as mobile communication terminal, user equipment (UE), mobile terminal, user terminal, user agent, wireless terminal, machine-to-machine devices etc., and can be, for example, what today are commonly known as a mobile phone or a tablet/laptop with wireless connectivity or fixed mounted terminal.

The cellular network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Uplink (UL) communication (from the wireless device 2 to the network node 1) 4b and downlink (DL) communication 4a (from the network node 1 to the wireless device 2) occur over a wireless radio interface. The quality of the wireless radio interface to each wireless device 2 can vary over time and depends on the position of the wireless device 2, due to effects such as fading, multipath propagation, interference, etc.

The network node 1 is also connected to the core network 3 for connectivity to central functions and a wide area network 6, such as the Internet.

For handling retransmissions of failed Media Access Control (MAC) packets, Hybrid Automatic Repeat Request (HARQ) can be used. The HARQ procedure involves providing quick feedback in the form of acknowledgements (ACK) or negative acknowledgements (NACK) to the transmitter for each transport block, depending on the result of the decoding applied at the receiver (e.g. using Cyclic Redundancy Check (CRC)).

In LTE, HARQ feedback (ACK/NACK) for downlink transmissions, HARQ feedback (ACK/NACK) are conveyed using the Physical Uplink Control Channel (PUCCH) that is transmitted by the wireless device upon detection of a downlink transmission on the Physical Downlink Shared Channel (PDSCH) by the network node. If there is a Physical Uplink Shared Channel (PUSCH) transmission from the wireless device in the same subframe, the HARQ feedback will instead be bundled with the data on PUSCH. For uplink transmissions, HARQ feedback is conveyed by the Physical Hybrid-ARQ Indicator Channel (PHICH) channel that is transmitted by the network node 1 upon detection of an uplink transmission on the Physical Uplink Shared Channel (PUSCH) by the wireless device 2.

Figure 2:
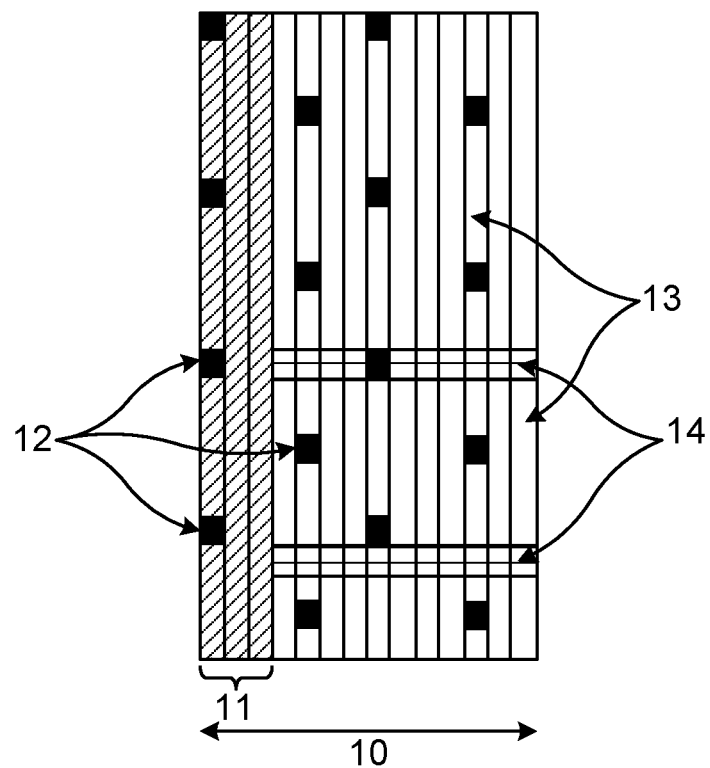
FIG. 2 is a schematic diagram illustrating a structure of a downlink subframe which can be used in the environment of FIG. 1.

FIG. 2 is a schematic diagram illustrating a structure of a downlink subframe 10 which can be used in the environment of FIG. 1. In the downlink, transmissions are divided into subframes of length 1 ms. Each subframe 10 is typically divided into 14 OFDM (Orthogonal Frequency Domain Multiplexing) symbols. The first 1, 2, 3 or 4 OFDM symbols are used to transmit the downlink control channel Physical Downlink Control Channel (PDCCH) 11 which carries information on scheduling assignments using DCI (Downlink Control Information) messages. These assignments contain information to the wireless devices on scheduling of data in both DL and UL. The remaining part of the downlink subframe 10 is used to transmit downlink data on PDSCH (Physical Downlink Shared Channel) 13. On some of the OFDM symbols there are also cell-specific reference symbols, CRS, 12 present.

The size of the control region 11 is decided by a CFI (Control Format Indicator) value which is transmitted on PHICH (Physical HARQ Indicator Channel) in the first OFDM symbol of each subframe 10. The control region 11 is logically divided into CCEs (Control Channel Elements). A PDCCH then uses a number of these CCEs to transmit the DCI. How many CCEs to use depends on the amount of coding the network node decides is needed for the wireless device to decode the message with adequate error probability.

Since the wireless device does not know exactly where the PDCCHs directed to it are located within the control region, it is forced to do blind decoding to extract the message. To keep the number of blind decoding combination, and hence also the processing load, on a reasonable level, 3GPP has defined a number of rules that restricts the mapping of the PDCCH onto the CCE space. Some rules that are applicable in here are:

1. The only allocation sizes the wireless device shall evaluate are 1, 2, 4 and 8 CCEs. These sizes are hereafter referred to as "aggregation levels".

2. The UEs are only required to monitor a few alternatives on each aggregation level. These alternatives are referred to as "search space".

3. The wireless device shall only evaluate for PDCCH assignments for which the condition "startCCEindex % aggregationLevel==0" is true, meaning that aggregation level 1 can start at any CCE index, aggregation level 2 can only start on even CCE indexes etc.

To avoid continuous blocking between the search spaces for two UEs, the candidates are changed with a pseudo-random scrambling based on wireless device identity and subframe number.

The total size of the CCE space, NCCEmax, depends on a number of factors such as system bandwidth, CFI, number of antenna ports, FDD/TDD (Frequency Division Duplex/Time Division Duplex) and normal/extended CP (Cyclic Prefix). Typical values for NCCEmax are around 20 to 50, and the lower and upper limits are 1 and 88, respectively.

In LTE Rel-11 a new downlink control channel, EPDCCH (Enhanced PDCCH), was added, see 14 of FIG. 2. This channel can be used to transmit wireless device specific scheduling assignments for those UEs that are EPDCCH capable. The EPDCCH channel is multiplexed with the downlink shared channel, PDSCH 13, covering all the OFDM symbols in a subframe 10 except for the control region 11 used by PDCCH. There are several use cases for EPDCCH such as increased control channel capacity, control channel ICIC (Inter-Cell Interference Coordination) support for HetNet and Combined Cell, and control channel beamforming.

An EPDCCH capable wireless device can be configured to monitor EPDCCH for wireless device specific scheduling assignments in all subframes or only in some of the subframes. The UEs are semi-statically assigned EPDCCH resources using wireless device dedicated RRC (Radio Resource Control) signaling. Similar to PDCCH, there are also typically multiple EPDCCHs in each subframe and the UEs will be required to monitor the EPDCCHs to be able to detect the wireless device specific assignments directed to them and in that way being able to find the data directed to them. In the subframes where the wireless device monitors EPDCCH for wireless device specific assignment, the legacy PDCCH is only monitored for common DL scheduling assignments such as e.g. SIB (System Information Block), paging and Random Access messages.

The wireless device can be assigned to monitor one or two EPDCCH sets. An EPDCCH set consist of 2, 4 or 8 resources being PRB (Physical Resource Block) pairs. Similar to the division of the control region into a logical CCE space, an EPDCCH set is divided into a logical ECCE (Enhanced CCE) space. An EPDCCH is then mapped onto a number of these ECCEs. The total number of available ECCEs in an EPDCCH set q, NECCEmax,q, depends on number of PRB pairs in the set, normal or extended CP, and normal or special subframe, and in case of special subframe, which special subframe configuration. The range of values for NECCEmax is [4, 8, 16, 32]. Furthermore, similar to PDCCH, there are also rules that restrict the mapping of the EPDCCH onto the ECCE space. The three rules listed for PDCCH above are also applicable to EPDCCH, but with a minor difference that there are other aggregation levels available for EPDCCH; 1, 2, 4, 8, 16 and 32. Not all of these aggregation levels are available simultaneously; the available levels depend on the configuration of e.g. number of PRB pairs in the EPDCCH set and size of the DCI message.

Some differences between EPDCCH and PDCCH is that EPDCCH only is used for wireless device specific assignments and is multiplexed with PDSCH, while PDCCH can be used for both wireless device specific and common assignments and that PDCCH is located in the control region in the beginning of each subframe while EPDCCH is multiplexed with PDSCH. Furthermore, the EPDCCH sets are wireless device specific, although it is possible to overlap the sets allowing for multiplexing of several EPDCCHs on the same PRB pairs. Finally, the EPDCCH is more flexible than the PDCCH supporting e.g. dynamic capacity, beamforming and ICIC, which is not possible for PDCCH.

The EPDCCH sets can be configured in two different modes; Localized or Distributed. In the Localized mode, the EPDCCH is transmitted in as few PRB pairs as possible while for the Distributed mode the EPDCCH is transmitted on as many PRB pairs as possible.

Figure 3:
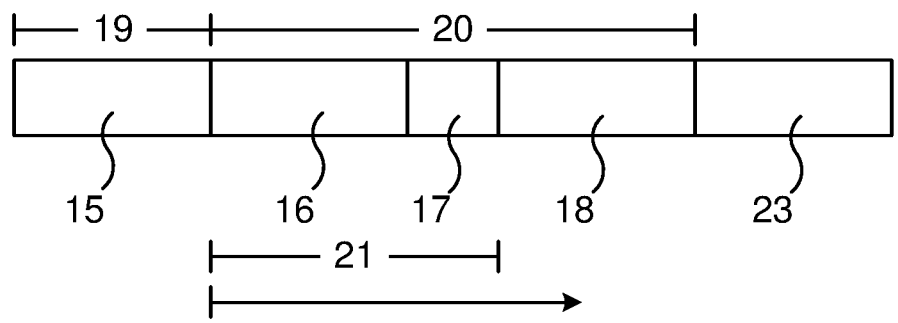
FIG. 3 is a schematic diagram illustrating one example of data allocations in the uplink.

FIG. 3 is a schematic diagram illustrating one example of data allocations in the uplink. The uplink is shown here for one of the band edges. A corresponding set can be provided at the other band edge. There is here a format 2 region 19, a format 1 region 20 and a data region for PUSCH 23. The format 2 region 19 carries CQI (Channel Quality Indicators) 15. The format 1 region 20 carries scheduling requests 16, channel selection 17 and a HARQ space 18 for control sets for HARQ. It is to be noted that the order of the scheduling requests 16, the channel selection 17 and the HARQ space 18 is interchangeable and the different control data types can also be intertwined.

The HARQ feedback for wireless device specific DL assignments transmitted on PDCCH is transmitted in the HARQ space 18, on PUCCH PRB pairs within format 1, reference 20 in FIG. 3. PUCCH Format 1 uses code multiplexing, allowing up to 36 PUCCH Format 1 resources to share one PUCCH PRB pair, where a PUCCH Format 1 resource is defined by a PRB pair and a spreading code.

The mapping of the HARQ ACK/NACK resource onto the PUCCH Format 1 resource is known to both the network node and the wireless device. For this the 3GPP standard has defined a rule where the first CCE index of the PDCCH assignment is used to point out which PUCCH resource that shall be used. The mapping follows the following function:

$$n_{PUCCH}^{(1,\tilde{p}0)} = n_{CCE} + N_{PUCCH}^{(1)} \quad (1)$$

where $n_{CCE}$ is the number of the first CCE (i.e. lowest CCE index used to construct the PDCCH) used for transmission of the corresponding DCI assignment and $N_{PUCCH}^{(1)}$ is RRC configured per cell, see 21 of FIG. 3.

The PUCCH Format 1 indices used for HARQ feedback for PDCCH can from the above be calculated as $$(N_{PUCCH}^{(1)}, N_{PUCCH}^{(1)} + N_{CCEmax} - 1). \quad (2)$$

Hence, the PUCCH HARQ space for PDCCH will start at $N_{PUCCH}^{(1)}$ and the size will be $N_{CCEmax}$.

The price paid for this is that the network node loses the ability to pack PUCCH resources for HARQ feedback. For example, if the network node allocates two UEs with CCE start index being 0 and 80 respectively, the UEs will send the HARQ feedback in two separate PRBs with at least two PRBs between them (depending in the PUCCH configuration) making those up to four PRBs unusable for PUSCH.

Looking now to feedback for EPDCCH, the HARQ feedback for wireless device specific DL DCI messages on EPDCCH is transmitted on PUCCH in a very similar way to the HARQ feedback for messages on PDCCH.

The mapping is derived from the following:
if EPDCCH-PRB-set q is configured for Distributed transmission $$n_{PUCCH}^{(1,\tilde{p}0)} = n_{ECCE,q} + \Delta_{ARO} + N_{PUCCH,q}^{(e1)} \quad (3)$$

if EPDCCH-PRB-set q is configured for Localized transmission $$n_{PUCCH}^{(1,p_0)} = \left\lfloor \frac{n_{ECCE,q}}{N_{RB}^{ECCE,q}} \right\rfloor \cdot N_{RB}^{ECCE,q} + n' + \Delta_{ARO} + N_{PUCCH,q}^{(e1)} \quad (4)$$

where $n_{ECCE,q}$ is the number of the first ECCE (i.e. lowest ECCE index used to construct the EPDCCH) used for transmission of the corresponding DCI assignment and $N_{PUCCH,q}^{(e1)}$ is RRC configured per EPDCCH set q. $\Delta_{ARO}$ is an ACK/NACK resource offset determined from the HARQ-ACK resource offset field in the DCI format of the corresponding EPDCCH and can take the values −2, −1, 0 and +2. $N_{RB}^{ECCE,q}$ is the number of ECCEs per resource-block pair and n' is determined from the antenna port used for localized EPDCCH transmission.

The PUCCH Format 1 indices used for EPDCCH HARQ feedback can from the above expressions be calculated as $$(N_{PUCCH,q}^{(e1)} - 2, N_{PUCCH,q}^{(e1)} + N_{ECCEmax,q} + 2 - 1) \quad (5)$$

where the "+2" and "−2" are due to the ACK/NACK resource offset values $\Delta_{ARO}$.

The size of the PUCCH EPDCCH HARQ control set for EPDCCH set q will thus be $N_{ECCEmax,q} + 4$. Herein, the PUCCH starting index and size of this EPDCCH set for simplicity is referred to as $N_{PUCCH,q}^{(e1)}$ and $N_{ECCEmax,q}$ without any loss of generality.

The introduction of the $\Delta_{ARO}$ value for EPDCCH allows for moving the EPDCCH PUCCH resource indices a few steps in either direction and thus allowing for overlapping the PDCCH and EPDCCH PUCCH HARQ control sets and still avoiding collisions between PUCCH resources to some extent.

The mapping of the PUCCH HARQ indexes onto the PUCCH Format 1 region is mainly determined by the setting of the starting indices ($N_{PUCCH}^{(1)}$, $N_{PUCCH,0}^{(e1)}$, ..., $N_{PUCCH,Q-1}^{(e1)}$) and the size of the different sets ($N_{CCEmax}$, $N_{ECCEmax,0}$, ..., $N_{ECCEmax,Q-1}$). The PDCCH PUCCH HARQ starting index $N_{PUCCH}^{(1)}$ is defined as an offset within the PUCCH PRBs using Format 1, which is slightly different from the definition of the EPDCCH set PUCCH HARQ indices, $N_{PUCCH,q}^{(e1)}$, which is defined as the offset from the first UL PRB in the UL system bandwidth. Both offsets are here used in the same manner without any loss of generality. The size of the sets is controlled by CFI, system bandwidth etc. for PDCCH and by the number of EPDCCH PRB pairs, CP etc. for EPDCCH. In most cases it is very difficult to change those parameters just for the purpose of doing a good HARQ mapping to the PUCCH Format 1 region. That leaves us with the setting of the start indices to work with.

The design goals when setting the start indices are:
Allocate as few PUCCH Format 1 PRB pairs as possible to PUCCH HARQ to allow for more PUSCH PRBs or more PUCCH resources for better SR and/or CQI capacity.
Minimize the risk of colliding PUCCH HARQ resources, e.g. by reducing overlap between the different PDCCH/EPDCCH PUCCH sets.
Do not allocate too many PUCCH HARQ resources into one PUCCH PRB pair to avoid performance degradation, i.e. do not "pack" too densely.
Do not allocate too few PUCCH HARQ resources into one PUCCH PRB pair to avoid wasting to many PRB pairs on PUCCH HARQ.

Some of the above design goals are contradictive, but with embodiments presented herein, the HARQ resources are allocated in an efficient and balanced way.

Figure 4:
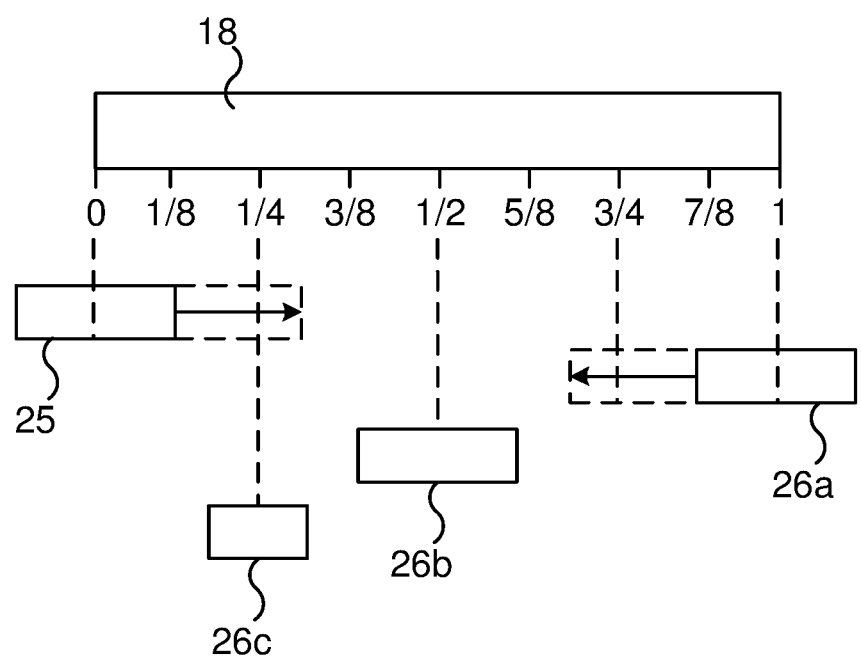
FIG. 4 is a schematic diagram illustrating placement of HARQ control sets in a PUCCH HARQ space.
Figure 5:
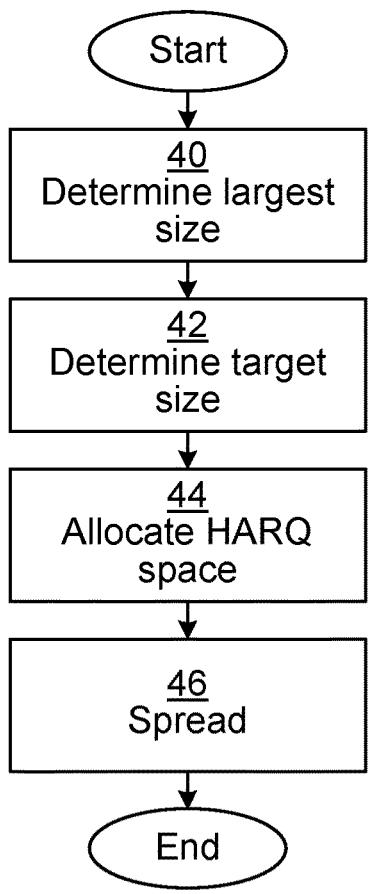
FIG. 5 is a flow chart illustrating a method for allocating space for HARQ.

FIG. 5 is a flow chart illustrating a method for allocating space for a plurality of control sets for HARQ. As explained above, each control set comprises elements for carrying HARQ indicators. FIG. 5 will now be described with reference also to FIG. 4. FIG. 4 is a schematic diagram illustrating placement of HARQ spaces in PUCCH.

The first three steps 40, 42, 44 of the method are related to calculating the PUCCH Format 1 space required to at the same time fit all PDCCH/EPDCCH PUCCH HARQ control sets into the PUCCH HARQ space, and also allow for reasonable packing of PUCCH HARQ resources with regard to performance and risk of PUCCH resource collision. For this purpose, we introduce the following two parameters:

$N_{maxHarqPerCell}$: Maximum number of PUCCH HARQ per cell and subframe. This value is can be capped in the network node due to implementation limitations such as memory and processing constraints.

$N_{targetPF1PerPpp}$: Target number of allocated PUCCH Format 1 resources per PUCCH PRB pair to meet the HARQ performance requirements. This value can be estimated by simulations or be obtained using field trials.

In a determine largest size step 40, the largest set size, in number of resources, of any one of the plurality of control sets is determined. First, a list S of the sizes of all PDCCH and EPDCCH PUCCH HARQ spaces is generated, starting with the PDCCH PUCCH HARQ space followed by the EPDCCH PUCCH HARQ space(s):

$$S = (N_{CCEmax}, N_{ECCEmax,0}, \ldots, N_{ECCEmax,Q-1}) \quad (6)$$

The PDCCH PUCCH HARQ space is treated separately and is optionally placed first in the list since PDCCH will always be used, and PDCCH will always have the common search space located at low CCE indices; 0, 4, 8, 12, which makes it desirable to protect those offsets more.

Secondly, the PDCCH/EPDCCH PUCCH HARQ space with the maximum size is derived:

$$N_{CCEandECCmax} = \max(S) \quad (7)$$

At least this PUCCH HARQ space needs to be supported, otherwise the largest HARQ control set will not fit.

In a determine target size step 42, a target size, in number of resources, to be allocated for HARQ is determined.

One way of doing this will now be described. Firstly, the required number of PUCCH Format 1 resources is calculated to meet the maximum number of PUCCH HARQ resources per cell and subframe, $N_{maxHarqPerCell}$, and at the same time meet the target number of allocated PUCCH Format 1 resources per PUCCH PRB pair, $N_{targetPF1PerPpp}$:

$$N_{targetPF1HarqSize} = \mathrm{ceiling}((N_{maxHarqPerCell}/N_{targetPF1PerPpp})*36) \quad (8)$$

where 36 is the PUCCH PRB pair code multiplexing capacity, which can differ depending on the circumstances.

In an allocate HARQ space step 44, a HARQ space is allocated. The HARQ space has a size, in number of resources, which is the maximum of the largest set size and the target size. This results in the $N_{PF1HarqSize}$, i.e. the combined PUCCH HARQ space size to be used for both PDCCH and EPDCCH HARQ feedback.

All PUCCH HARQ resources will be mapped within this space. Note that this space does not need to be exclusively reserved for PUCCH HARQs, thus allowing also for other resources such as e.g. CS and SR also being mapped in this area.

In a spread step 46, the plurality of control sets are spread within the HARQ space. In other words, the different PDCCH/EPDCCH PUCCH HARQ control sets are distributed within this space aiming to distribute the PUCCH HARQ load evenly within the combined PUCCH HARQ space.

A goal is to spread the PDCCH and EPDCCH PUCCH HARQ spaces within the Combined PUCCH HARQ space while avoiding overlapping PUCCH HARQ spaces when possible, thereby reducing the risk of PUCCH resource collision and also equalize the PUCCH Format 1 load between different PRB pairs to increase the chances of correct detection in the network node.

This is here done by a pre-defined spreading function. Other spreading functions can also be applied. Here, a single PDCCH PUCCH HARQ control set and Q EPDCCH PUCCH HARQ control sets are to be spread in the Combined PUCCH HARQ space.

Firstly, the desired normalized midpoint for each PUCCH set i is calculated according to (9):

$$N_{mid}(i) = w(i) * N_{PF1HarqSize}, \text{ for } i=0, \ldots, Q \quad (9)$$

where w=[0, 1, ½, ¼, ¾, ⅛, ⅝, ⅜, ⅞, 1/16, 9/16, 5/16, 13/16, 3/16, 11/16, 7/16, 15/16, . . . ].

This can be seen in FIG. 4, where the PDCCH HARQ control set 25 is placed with a midpoint at 0 and the three EPDCCH HARQ control sets 26*a-c* are placed successively with respective midpoints at 1, ½ and ¼.

Secondly, the starting offset to each PUCCH HARQ control set is calculated by centering the PUCCH HARQ space around the previously calculated midpoint $N_{mid}(i)$ in (10):

$$N_{offset}(i) = \mathrm{round}(N_{mid}(i) - S(i)/2), \text{ for } i=0, \ldots, Q \quad (10)$$

Finally, any PUCCH HARQ control set with resources outside the combined PUCCH HARQ space is shifted to ensure that all HARQ control sets are mapped completely inside the Combined PUCCH HARQ space.

In quasi code, the following algorithm will then be performed:

---

For all PUCCH HARQ control sets i do:
if ($N_{offset}(i) < 0$) [see e.g. for the PDCCH HARQ control set 25]
then
    $N_{offset}(i) = 0$
elseif ($N_{offset}(i) > N_{PF1HarqSize} - S(i)$) [see e.g. for the first EPDCCH HARQ control set 26a]
then
    $N_{offset}(i) = N_{PF1HarqSize} - S(i)$

---

The spreading scheme example above can be improved in several ways, but at the cost of increased processing and/or memory consumption. For instance, to achieve a more even PUCCH HARQ control set distribution, any one or more of the following measures can be considered:

Taking the size of each PDCCH/EPDCCH set into account when calculating the offset to each PUCCH HARQ control set.

Including the search space PDCCH/EPDCCH restriction "startCCEindex % aggregationLevel=0". This implies that some CCE/ECCE indexes as more likely to occur. For example indexes 0, 8, 16, . . . can be used by all aggregation levels 1, 2, 4 and 8, while indexes 1, 3, 5, . . . can only be used by aggregation level 1.

Including knowledge of the distribution of the aggregation levels for each PDCCH/EPDCCH set. For example, if it is known that aggregation level 8 is more common, the corresponding indexes can be more protected, i.e. those indexes should not overlap between different PDCCH/EPDCCH sets.

If the DCI load on the different PDCCH/EPDCCH sets vary this can be utilized in the spreading algorithm. For example, PDCCH/EPDCCH sets that are more loaded should be more protected, i.e. less overlaid.

This method can be performed when a new cell is configured in the node and can be repeated when the configuration changes, e.g. if an EPDCCH set is added or removed.

Since the EPDCCH sets are wireless device specific it is possible that also the EPDCCH PUCCH HARQ control sets are wireless device specific. However, it is allowed with overlaying of multiple EPDCCH sets and also for overlaid EPDCCH PUCCH HARQ control sets. The method handles both of these configurations.

Figure 6:
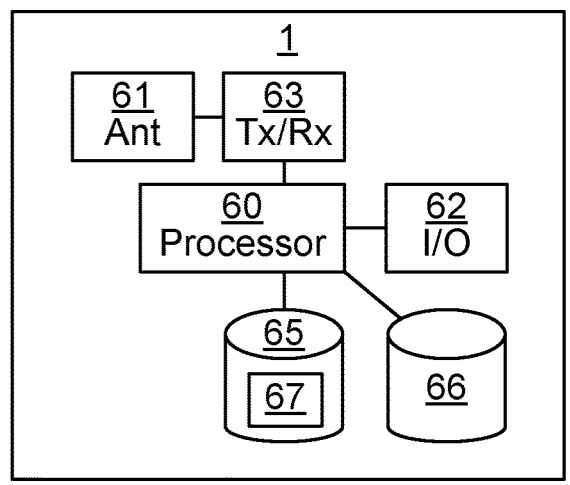
FIG. 6 is a schematic diagram illustrating some components of the network node of FIG. 1.

FIG. 6 is a schematic diagram showing some components of the network node 1 of FIG. 1. A processor 60 is provided using any combination of one or more of a suitable central processing unit (CPU), multiprocessor, microcontroller, digital signal processor (DSP), application specific integrated circuit etc., capable of executing software instructions 67 stored in a memory 65, which can thus be a computer program product. The processor 60 can be configured to execute the method described with reference to FIG. 5 above.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 63 can be any combination of read and write memory (RAM) and read only memory (ROM).

The network node 1 further comprises an I/O interface 62 for communicating with other external entities. Optionally, the I/O interface 62 also includes a user interface.

The network node 1 also comprises one or more transceivers 63, comprising analogue and digital components, and a suitable number of antennas 61 for wireless communication with wireless devices.

Other components of the network node 1 are omitted in order not to obscure the concepts presented herein.

Figure 7:
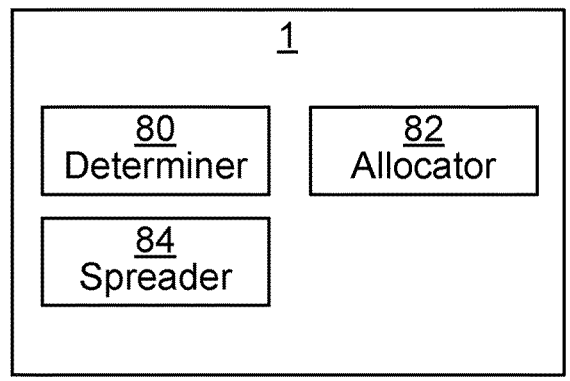
FIG. 7 is a schematic diagram showing functional modules of the network node of FIGS. 1 and 6.

FIG. 7 is a schematic diagram showing functional modules of the network node 1 of FIGS. 1 and 6. The modules can be implemented using software instructions such as a computer program executing in the network node 1 and/or using hardware, such as application specific integrated circuits, field programmable gate arrays, discrete logical components, etc. The modules correspond to the steps in the method illustrated in FIG. 5.

A determiner 80 is configured to perform steps 40 and 42. An allocator 82 is configured to perform step 44 and a spreader 84 is configured to perform step 46.

Figure 8:
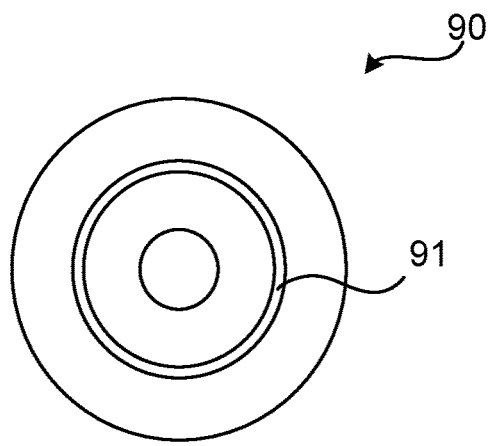
FIG. 8 shows one example of a computer program product comprising computer readable means.

FIG. 8 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 65 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for allocating space for a plurality of control sets for Hybrid Automatic Repeat Request (HARQ), wherein each control set comprising elements for carrying HARQ indicators, the method being performed in a network node comprising:
   determining a largest set size, in number of resources, of any one of the plurality of control sets, the control sets including control sets for Physical Downlink Control Channel (PDCCH) and Enhanced Physical Downlink Control Channel (EPDCCH), wherein the determining the largest set size is performed by listing sizes of PDCCH Physical Uplink Control Channel (PUCCH) HARQ space and EPDCCH PUCCH HARQ space and identifying largest of the PDCCH PUCCH HARQ space and EPDCCH PUCCH HARQ space;
   determining a target size, in number of resources, to be allocated for PUCCH HARQ, by calculating the number of resources required to meet a maximum number of PUCCH HARQ resources;
   allocating a combined PUCCH HARQ space for allocating the PDCCH PUCCH HARQ space and the EPDCCH PUCCH HARQ space, wherein the combined PUCCH HARQ space having a size, in number of resources, being a maximum of the largest set size and the target size; and
   spreading the plurality of control sets within the combined PUCCH HARQ space.

2. The method according to claim 1, wherein the determining the target size comprises considering a first parameter indicating a maximum number of PUCCH HARQ indicators per cell and subframe.

3. The method according to claim 2, wherein the determining the target size comprises considering a second parameter indicating a target number of PUCCH HARQ indicators per resource.

4. The method according to claim 3, wherein the determining the target size comprises calculating the target size using a quote of the first parameter divided by the second parameter.

5. The method according to claim 1, wherein each resource is defined by a pair of physical resource blocks (PRB) and a spreading code.

6. The method according to claim 1, wherein the spreading comprises spreading mid points of the plurality of control sets and shifting a control set having an element outside the PUCCH HARQ space.

7. The method according to claim 1, wherein the spreading comprises spreading the control sets for PDCCH before spreading the control sets for EPDCCH.

8. A network node for allocating space for a plurality of control sets for Hybrid Automatic Repeat Request (HARQ), wherein each control set comprising elements for carrying HARQ indicators, the network node comprising:
   a processor; and
   a memory storing instructions that, when executed by the processor, cause the network node to:
      determine a largest set size, in number of resources, of any one of the plurality of control sets, the control sets including control sets for Physical Downlink Control Channel (PDCCH) and Enhanced Physical Downlink Control Channel (EPDCCH), wherein the largest set size is determined by listing sizes of PDCCH Physical Uplink Control Channel (PUCCH) HARQ space and EPDCCH PUCCH HARQ space and identifying largest of the PDCCH PUCCH HARQ space and EPDCCH PUCCH HARQ space;
      determine a target size, in number of resources, to be allocated for PUCCH HARQ, by calculating the number of resources required to meet a maximum number of PUCCH HARQ resources;
      allocate a combined PUCCH HARQ space by allocating the PDCCH PUCCH HARQ space and the EPDCCH PUCCH HARQ space, wherein the combined PUCCH HARQ space having a size, in number of resources, being a maximum of the largest set size and the target size; and
      spread the plurality of control sets within the combined PUCCH HARQ space.

9. The network node according to claim 8, wherein the instructions to determine the target size comprise instructions that cause the network node to consider a first parameter indicating a maximum number of PUCCH HARQ indicators per cell and subframe.

10. The network node according to claim 9, wherein the instructions to determine the target size comprise instructions that cause the network node to consider a second parameter indicating a target number of PUCCH HARQ indicators per resource.

11. The network node according to claim 10, wherein the instructions to determine the target size comprise instructions that cause the network node to calculate the target size using a quote of the first parameter divided by the second parameter.

12. The network node according to claim 8, wherein each resource is defined by a pair of physical resource blocks (PRB) and a spreading code.

13. The network node according to claim 8, wherein the instructions to spread comprise instructions that cause the network node to spread mid points of the plurality of control sets and shifting a control set having an element outside the PUCCH HARQ space.

14. The network node according to claim 8, wherein the instructions to spread comprise instructions that, when executed by the processor, cause the network node to spread the control sets for PDCCH before spreading the control sets for EPDCCH.

15. A network node comprising:
  means for determining a largest set size, in number of resources, of any one of a plurality of control sets for Hybrid Automatic Repeat Request (HARQ), the control sets including control sets for Physical Downlink Control Channel (PDCCH) and Enhanced Physical Downlink Control Channel (EPDCCH), wherein the means for determining the largest set size determines the largest set size by listing sizes of PDCCH Physical Uplink Control Channel (PUCCH) HARQ space and EPDCCH PUCCH HARQ space and identifying largest of the PDCCH PUCCH HARQ space and EPDCCH PUCCH HARQ space;
  means for determining a target size, in number of resources, by calculating the number of resources required to meet a maximum number of PUCCH HARQ resources;
  means for allocating a combined PUCCH HARQ space by allocating the PDCCH PUCCH HARQ space and the EPDCCH PUCCH HARQ space, wherein the combined PUCCH HARQ space having a size, in number of resources, being a maximum of the largest set size and the target size; and
  means for spreading the plurality of control sets within the combined PUCCH HARQ space.

16. A non-transitory computer readable storage medium having computer program code stored therein for allocating space for a plurality of control sets for Hybrid Automatic Repeat Request (HARQ), wherein each control set comprising elements for carrying HARQ indicators, the computer program code which, when run on a network node, causes the network node to perform operations comprising:
  determining a largest set size, in number of resources, of any one of the plurality of control sets, the control sets including control sets for Physical Downlink Control Channel (PDCCH) and Enhanced Physical Downlink Control Channel (EPDCCH), wherein the determining the largest set size is performed by listing sizes of PDCCH Physical Uplink Control Channel (PUCCH) HARQ space and EPDCCH PUCCH HARQ space and identifying largest of the PDCCH PUCCH HARQ space and EPDCCH PUCCH HARQ space;
  determining a target size, in number of resources, to be allocated for PUCCH HARQ, by calculating the number of resources required to meet a maximum number of PUCCH HARQ resources;
  allocating a combined PUCCH HARQ space to allocate the PDCCH PUCCH HARQ space and the EPDCCH PUCCH HARQ space, wherein the PUCCH HARQ space having a size, in number of resources, being a maximum of the largest set size and the target size; and
  spreading the plurality of control sets within the combined PUCCH HARQ space.

\* \* \* \* \*